(12) United States Patent
Aaltonen

(10) Patent No.: US 8,023,966 B2
(45) Date of Patent: Sep. 20, 2011

(54) SYSTEMS, DEVICES, METHODS AND COMPUTER PROGRAM PRODUCTS FOR DOWNLOADING CONTENT TO MOBILE DEVICES IN A ROAMING ENVIRONMENT

(75) Inventor: Janne La. Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 24 days.

(21) Appl. No.: 11/018,027

(22) Filed: Dec. 21, 2004

(65) Prior Publication Data

US 2006/0135179 A1 Jun. 22, 2006

(51) Int. Cl.
*H04Q 7/20* (2006.01)
(52) U.S. Cl. ............... 455/456.3; 455/414.1; 455/404.2; 455/412.1; 455/456.1; 455/407
(58) Field of Classification Search ....... 455/456.1–557, 455/41.2, 412.1–414.3, 414.4, 517, 404.2, 455/407, 425; 342/357.9
See application file for complete search history.

(56) References Cited

U.S. PATENT DOCUMENTS

| | | | |
|---|---|---|---|
| 6,552,682 B1 * | 4/2003 | Fan | 342/357.09 |
| 6,813,608 B1 * | 11/2004 | Baranowski | 705/6 |
| 6,973,322 B2 * | 12/2005 | Buchmann et al. | 455/456.3 |
| 7,020,468 B2 * | 3/2006 | Squibbs et al. | 455/445 |
| 2002/0016162 A1 * | 2/2002 | Yoshihara et al. | 455/412 |
| 2002/0193150 A1 * | 12/2002 | Pritchard | 455/567 |
| 2003/0216145 A1 * | 11/2003 | Cox et al. | 455/456.1 |
| 2004/0002988 A1 * | 1/2004 | Seshadri et al. | 707/102 |
| 2004/0139204 A1 * | 7/2004 | Ergezinger et al. | 709/229 |
| 2005/0043050 A1 * | 2/2005 | Lee et al. | 455/515 |
| 2007/0089110 A1 * | 4/2007 | Li | 717/178 |

* cited by examiner

*Primary Examiner* — Patrick Edouard
*Assistant Examiner* — Fred Casca
(74) *Attorney, Agent, or Firm* — Alston & Bird LLP

(57) ABSTRACT

Systems, devices and methods are presented for downloading content to a mobile terminal, during periods when the mobile terminal is outside of the home network; i.e. when the terminal is roaming. The invention provides for downloading of the content without utilizing the cellular network, thereby, circumventing the additional surcharges that may be associated with providing for downloading outside of the home network environment. In addition, the invention provides for methods and systems that may be implemented automatically, without the user having to interface with the device or system to implement the change in download techniques. Also, the content can be downloaded during normal download schedules so that the user is not adversely affected by their travel schedule and can be assured scheduled program downloads throughout the travel period.

52 Claims, 4 Drawing Sheets

SYSTEMS, DEVICES, METHODS AND COMPUTER PROGRAM PRODUCTS FOR DOWNLOADING CONTENT TO MOBILE DEVICES IN A ROAMING ENVIRONMENT

FIELD OF THE INVENTION

The present invention relates to content downloading in a mobile device and, more specifically to methods, devices, systems and computer program products for downloading content to a mobile device that prior to or while in a roaming environment.

BACKGROUND OF THE INVENTION

An increasing amount of mobile devices, such as cellular telephones, personal digital assistants (PDAs) and the like are equipped with multimedia capability. In this capacity, the multimedia equipped mobile devices are able to execute all types of multimedia files, such as video files, audio files and the like. In addition to multimedia capability, mobile devices are consistently expanding in terms of memory capacity. For example, cellular telephones are currently available with 16 mega byte (Mbyte) and 32 Mbyte local memories. An alternative or additional capability, mobile devices may have built-in flash memory and or memory capacities of mobile devices may be expandable with external multimedia card (MMC) slot for user data. The need to expand memory capacity is essential in the multimedia equipped mobile device because the typical multimedia file is a large volume file that requires ample storage space to execute the file and/or store the file. However, as the multimedia functionality of the mobile device increases, so too, will the memory capacity and the user is assured that next generation mobile devices will customarily be available with sufficient memory capacity to support all facets of multimedia capabilities.

The deployment of advanced high bit-rate mobile networks has opened up new opportunities for delivering a host of services in a way that was not possible with earlier second generation wireless networks. Recent systems including third generation (3 G) systems, such as those specified for use with the Global System for Mobile Communications (GSM) wireless standard, enable the delivery of new digital services such as video calls and the playback of multimedia applications that are comprised of audio and video clips. In this regard, the increased bit rates of 3 G systems widen the possibilities for providing digital services. Please also refer to current 2 G and 2.5 G systems hence content is already widely transferred using e.g. GPRS.

As the ability to send multimedia content over wireless networks, such as cellular and non-cellular networks and the like, becomes more commonplace, the prospect grows for numerous content delivery or content download models that will greatly benefit the mobile device user. For example, one model has been discussed whereby the mobile device user subscribes to a service that provides for programs to be downloaded to the mobile device on a regular schedule. In this model, a user may subscribe to a service that provides e.g. daily, weekly or monthly delivery (i.e., download) of a program, such as a soap opera, a talk show or the like, typically transmitted by a television network. The user of such a service benefits from having the programming automatically downloaded to the mobile device, assuring that the user does not miss an episode of the program. In addition, since the programming is provided to a mobile terminal the active user can view the program at any time or at any place However, content downloading of large data files, such as multimedia files and the like, typically requires ample download time or bandwidth to transmit the file from the source to the mobile device. Download time presents problems in the wireless communication realm; such as, the cost associated with transmitting a large multimedia file and the actual time for downloading which may limit the users ability to otherwise communicate via the cellular network. In order to address these concerns, it is envisioned that the majority of content downloading would occur during off-peak hours, i.e., typically during the night time or during any other suitable time defined by the service or content provider This allows content providers to offer the service at economical delivery rates and would not greatly impact the device user's ability to otherwise communicate via the network.

While night-time content downloading addresses problems associated with the mobile device user, it does not address all of the economical problems associated with content downloading in mobile devices and, specifically problems encountered by the user when the mobile device "roams", i.e., travels outside of the home network. Typically, the user of the cellular network is provided service to a home network and the ability to roam outside of the home network to other networks is provided if the service provider has appropriate agreements in place with the other networks. Generally, the ability to roam to another network comes at an additional cost to the user, either the costs are built in to the user's service agreement or the costs are in addition to the user's service agreement.

FIG. 1 provides a block diagram depiction of a home network and a corresponding roaming network, in accordance with the prior art. The home network 10, typically a General Packet Radio Service (GPRS) network includes Base Transceiver Station (BTS) 20, a Base Station Controller (BSC) 30. The BTS receives and terminates wireless communications transmitted from and to Mobile Station(s) (MS A) 40, i.e. mobile terminals, such as cellular telephones and the like. The BSC is the functional entity within the Global System for Mobile (GSM) communication that is responsible for Radio resource (RR) allocation to a Mobile Station, frequency administration and handover between the BTS controlled by the BSC. The BSC provides an interface to the Packet Switch Telephone Network (PSTN) 50 and the GPRS core network 60. A Mobile Switch Center (MSC) 70 is communication with the BSC and PSTN and provides an exchange within the network that is capable of interworking with location databases. The MSC is in communication with a Home Location Register (HLR) 80 that maintains user subscription information for home network subscribers. A Packet Control Unit (PCU) 90 is in communication with the BSC and a Service GPRS Support Node (SGSN) 100 and is responsible for the radio related aspects of the GPRS. The SGSN keeps track of the location of an individual MS and performs security functions and access control to the GPRS core network. Gateway GPRS Support Nodes (GGSN) 110 supports the edge routing function of the GPRS network acting as an Internet Protocol (IP) router to the Internet 120.

The GPRS Core network 60 will typically include one or more Border Gateway 130 that provide edge routing to neighboring networks. In this illustration the BG provides routing a connecting network 140, which in turn provides connection to the GPRS roaming network 150. GPRS roaming network is similarly configured with architecture that resembles the GPRS home network. In addition, the GPRS roaming network will include a Visitor Location Register (VLR) 160 that includes all subscriber data required for call handling and mobility management for mobile subscribers currently located in the area controlled by the VLR, i.e., the roaming network area. As such when the Mobile Station 40 travels outside of the home network to the area of the roaming network, the VLR will provide call handling and management for the MS, designated in FIG. 1 as MS-C.

In the business model proposed above, in which a subscriber is provided content downloading of a program on a regularly scheduled basis; hourly, daily, weekly or the like, if the user chooses to travel, the roaming charges that may incur may make content downloading highly undesirable. The user will be faced with paying an exorbitant rate to download while they are outside the home network or, more likely, will be forced to suspend the service during periods of travel. Suspending or stopping the service is to the disadvantageous of both the user and the service provider. The user of the service will be disappointed by not being able to habitually receive and view the program on the normal schedule and the service provider will lose revenue if the user suspends or otherwise cancels the service during the periods of travel.

Thus a need exists to develop a system and corresponding methods for providing content downloading to mobile terminals when the terminal is outside of the realm of the home-network, i.e. when the mobile device is roaming or when the device is about to roam but is still within the home network. The desired system and method will avoid connection to a roaming network and will, therefore, eliminate the need to incur costs related to accessing the roaming network. In addition, the desired system and methods will provide the mobile device user with a convenient means for downloading content in the roaming, i.e., travel, environment. Moreover, the desired methods and systems should provide for roaming or travel to occur on regular schedules or for a user travel profile to exist, such that the system recognizes when content downloading should be altered from the normal home-based downloading to the travel or roaming mode of content downloading and can automatically switch modes based on the user's schedule.

BRIEF SUMMARY OF THE INVENTION

The present invention provides for methods, systems, devices and computer programs for downloading content to a mobile station, otherwise referred to as a mobile terminal, during periods when the mobile terminal is outside of the home network; i.e. when the terminal is roaming or prior to the mobile terminal roaming outside the home network. The invention provides for downloading of the content without utilizing the roaming cellular network, thereby, circumventing the additional surcharges that may be associated with providing for downloading outside of the home network environment. The methods and systems provide for the user to identify, in advance, the periods of scheduled travel and for the user or the application to identify the hotspots (i.e. the specific geographic location in which an access point provides public wireless broadband network services to mobile visitors) that the user will encounter either leading up to the travel period or during the travel period. Once the travel periods and hotspots have been identified they are communicated to a content server application that retrieves the user content and communicates the content to the hotspot either prior to or during the user's encounter with the hotspot. In this regard, the mobile terminal is able to download the content from the hotspot access point when the terminal encounters the area of the hotspot. In alternate methods and systems, the mobile terminal identifies the travel periods and communicates such information to a content server. In turn, the content server is able to determine the content that would be sent to the mobile terminal during the travel period and, instead, communicates this content to the terminal prior to the travel period. The mobile terminal stores this content in memory and is typically not allowed to access this material until the regularly scheduled delivery times (i.e., the user can not access the content until specified times during the travel period.)

In one embodiment of the invention a method is defined for downloading content to a mobile terminal. The method includes the steps of determining a travel schedule for a user of a mobile terminal that defines a travel period, determining one or more hotspots associated with the travel period, communicating content to the one or more hotspots and downloading the content to the mobile terminal when the user comes in contact with one of the one or more hotspots. It is noted that the phrase "hotspots associated with the travel period" may include hotspots that the user may likely encounter prior to the travel period, hotspots that the user may likely encounter during the travel period or both. In those embodiments in which the hotspot is one that the mobile terminal may encounter prior to the travel period, the content may be protected such that it is only accessible to the user during the regularly scheduled delivery period (i.e., during the travel period).

The step of determining a travel schedule for a user of the mobile terminal will, in one embodiment, include the step of executing a client application on the mobile terminal. The client application may provide for user inputs, access to internal user planner/calendar applications and/or access to external databases, such as Web-based travel agent databases or the like. The client application may additionally be executed to determine the one or more hotspots that the user will likely encounter during the scheduled travel. The determination of the hotspots may be user's choice, based on recommendations provided by the client application or automatically determined by the client application. In an alternate embodiment, the determination of the hotspots that the user will encounter during the scheduled travel or prior to the travel may be accomplished by executing a server-side application.

The step of communicating content to the one or more hotspots prior to or during the scheduled travel may further include the steps of communicating the determined travel schedule and, in some embodiments, the determined hotspots, to a server having access to user content, retrieving the content at the server; and communicating the content from the server to access points at each of the one or more determined hotspots. If the access point at any given hotspot has associated storage capability then the server may communicate the content, if available, prior to the user encountering the hotspot. Storage at the hotspot provides for efficiency in downloading the content once the user encounters the area of hotspot. If the access point does not include storage capability then the server will be accessed by the access point, typically over Internet Protocol, when the user encounters the hotspot to retrieve the user's content.

The step of downloading the content to the mobile terminal when the user encounters one of the one or more hotspots will, in most embodiments, occur wirelessly. For example, wireless communication may occur over any known or future wireless communication medium such as Wireless Local Area Network (WLAN), Infrared (IR), Bluetooth® (i.e., communication in the about 2.4 GHz frequency range) and the like.

The invention is also embodied in an alternative method for downloading and accessing content in a mobile terminal. The method includes the steps of determining a travel schedule for a user of a mobile terminal that defines a travel period, determining the content that is scheduled to be delivered to the mobile terminal during the travel period and communicating to the mobile terminal, prior to the travel period, content that is scheduled to be delivered during the travel period. Once the content is communicated to the mobile terminal it is stored in the mobile terminal and is not accessible to the user until the regularly scheduled delivery periods (i.e., during the travel period).

In this embodiment the mobile terminal receives the content from the content server once the content server or content supplier is aware of the travel period. If the content supplier has immediate access to the information the content may be communicated to the mobile terminal, via conventional communication techniques, such as cellular or the like, and stored in the mobile terminal. Typically, the user will not be provided access to the content until the regularly scheduled delivery period (i.e., during the travel period).

As discussed in the previous embodiment, in this embodiment, the step of determining a travel schedule for a user of a mobile terminal that defines a travel period will typically occur at the mobile terminal and will be communicated to the content server via cellular or other network communications. Alternatively the determination of the user's travel schedule may occur at the content server. The invention is also embodied in a system for downloading content to a mobile terminal. The system includes a client application that determines a user travel schedule that defines a travel period, and a network or content server in communication with the client application that receives the user travel schedule from the client application and provides access to user content. The system additionally includes a plurality of access points located at a plurality of hotspots that are in communication with the network server. The access points provide the user with the capability to download the user content when the user encounters the hotspot either prior to the travel period or during the travel schedule (i.e., a hotspot that is associated with the travel period).

In one embodiment the content that is being downloaded by the user is subscription content, such as video or audio programs that are provided for download on a regularly scheduled basis, such as daily, weekly, monthly or the like.

The client application will typically be executed on the mobile terminal that the user will subsequently have content downloaded to, such as a cellular telephone, a PDA or the like. In alternate embodiments, the client application may reside on another digital device, such as a personal computer. The client application may determine the user's travel schedule based on user inputs to the client application, client application access to a user planner/calendar application or client application access to an external database, such as an Internet-based travel agent database or the like.

The client application, in many embodiments, will also determine one or more hotspots that the user will likely encountered during the scheduled travel period or will likely encounter prior to the travel period. Additionally, the client application, if it is executed on the mobile terminal that will download content, may provide for activating the short-range communication module associated with the device when the device encounters one of the determined hotspots, so as to automatically download the content from the access point.

The network server may further receive the determined hotspot information from the client application or the server may execute an application to determine the one or more roaming network hotspots the user will likely encounter during the scheduled travel period or the one or more home network hotspots that the user will likely encounter prior to the travel period. The hotspot information is used by the network server to indicate what hotspots should receive the user content during the scheduled period of travel or prior to the scheduled period of travel.

The plurality of access points will typically be wireless access points capable of short-range wireless communication, such as WLAN, IR or Bluetooth® communication. In alternate embodiments the access point may provide for wired communication between the mobile terminal and the access point. Additionally, the access points may be associated with a storage unit that provides for the user content to be communicated from the network server to the access point prior to the user of the mobile terminal encountering the hotspot either during the defined period for travel (i.e., a roaming network hotspot) or prior to the period of travel (i.e., a home network hotspot). Such access points and hotspots are referred to as being "intelligent". Storage of the content that requires downloading at the access point provides for efficient data transfer from the access point to the terminal. In alternate embodiments, in which the access point is not associated with a storage unit, the access point accesses the network server to retrieve the content.

In an alternate embodiment, the system for downloading content to a mobile terminal includes a mobile terminal that executes a client application that determines a user travel schedule and defines travel period and a content server in network communication with the client application that receives a user travel schedule and responds by communicating content, which is scheduled for delivery during the travel period, to the mobile terminal prior to the travel period. In this embodiment the mobile terminal provides a travel schedule to the content server and, based on availability of the content that is scheduled to be delivered during the travel period, communicates the content to the mobile terminal prior to the travel period. The mobile terminal will then typically store the content in device memory and the user will be provided access to the content only at regularly scheduled time periods (i.e., during the travel period).

The invention is also embodied in a mobile terminal device, such as a cellular telephone device, PDA device or the like. The device includes a processor that executes a client application that determines a device user's travel schedule and determines one or more hotspots that the user will likely encounter during the travel schedule or prior to the travel period (i.e., a hotspot that is associated with the travel period). The device also includes a wireless communication module that provides for downloading content when the device encounters one of the determined hotspots during the scheduled travel period. The processor that executes a client application to determine the user's travel schedule further provides for the schedule to be determined from a determination process chosen amongst user input to the client application, access to an internal user planner application, access to an external database or the like. Additionally, the processor that executes the client application may further provide for activating the wireless communication module when the device encounters one of the hotspots previously determined as a likely encountered hotspot.

The short-range wireless communication module may include a Wireless Local Area Network (WLAN) module, an Infrared (IR) module, a Bluetooth® or the like.

The device may additional provide for a cellular network communication module in communication with the processor that provides for cellular communication of the user's travel schedule and one or more hotspots to a network server that provides content access.

In addition the invention is embodied in an integrated circuit device for use in a mobile terminal. The device includes a first logic element for determining a mobile terminal user's travel schedule that defines a travel period and second logic element for determining an appropriate method for delivering content to the mobile terminal that would normally be delivered during the travel period. The first logic element may determine a mobile terminal user's travel schedule based on user inputs, accessing a user planner application, accessing one or more external databases or the like. The second logic element further defines the appropriate method as determining one or more hotspots that the user will likely encounter prior to the travel period or during the travel period.

Also, the invention is defined by a computer program product for assessing a mobile terminal user's travel schedule and preparing for content downloading during periods of travel or prior to periods of travel. The product includes a computer-readable storage medium having computer-readable program code portions stored therein. The computer-readable program code portions includes a first executable portion capable of determining a mobile terminal user's travel schedule and a second executable portion capable of determining one or more hotspots associated with the travel period (i.e., a hotspot that the user will likely encounter prior to or during the travel period). The first executable portion may determine a mobile terminal user's travel schedule based on user inputs to the computer program, accessing one or more user planner/calendar applications, accessing one or more external databases or the like. The computer-readable program code portions may further include a third portion capable of activating a short-range communication module when the mobile terminal encounters one of the hotspots during the scheduled travel period.

Thus, the present invention provides systems, devices and methods for downloading regularly scheduled content to a mobile terminal, during periods when the mobile terminal is outside of the home network; i.e. when the terminal is roaming or during periods prior to the travel period; i.e., the terminal is still in the home network. The invention provides for downloading of the content without utilizing the cellular network, thereby, circumventing the additional surcharges that may be associated with providing for downloading outside of the home network environment. In addition, the invention provides for methods and systems that may be implemented automatically, without the user having to interface with the device or system to implement the change in download techniques. Also, the content can be downloaded during normal download schedules so that the user is not adversely affected by their travel schedule and can be assured scheduled program downloads throughout the travel period. The methods and systems of the present invention are conducive to the users travel schedule and do not require the user to perform additional functions.

BRIEF DESCRIPTION OF THE DRAWINGS

Figure 1:
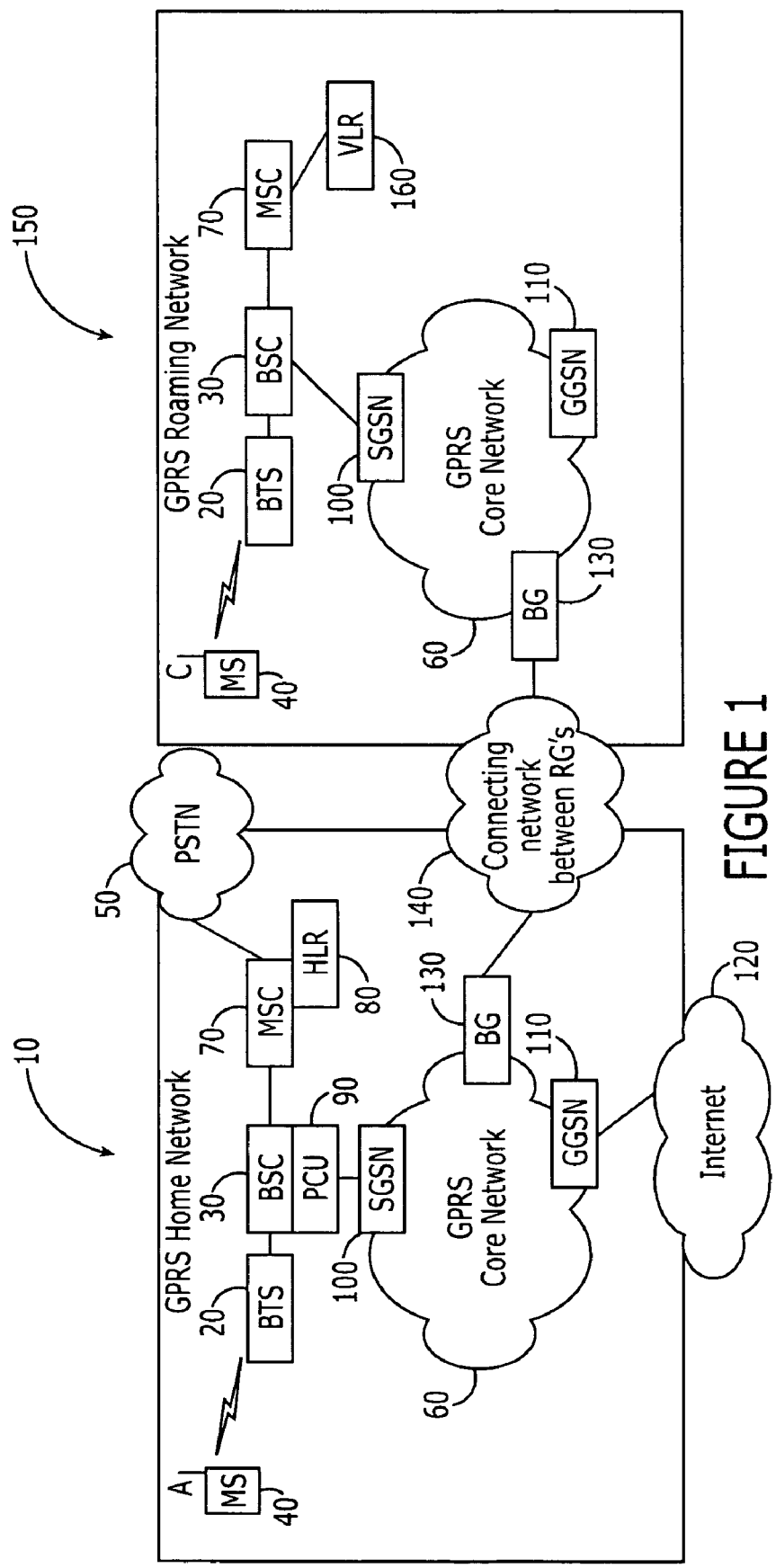

Having thus described the invention in general terms, reference will now be made to the accompanying drawings, which are not necessarily drawn to scale, and wherein:

FIG. 1 is a block diagram of a system for cellular network communication in a home and a roaming network environment, in accordance with the prior art.

Figure 2:
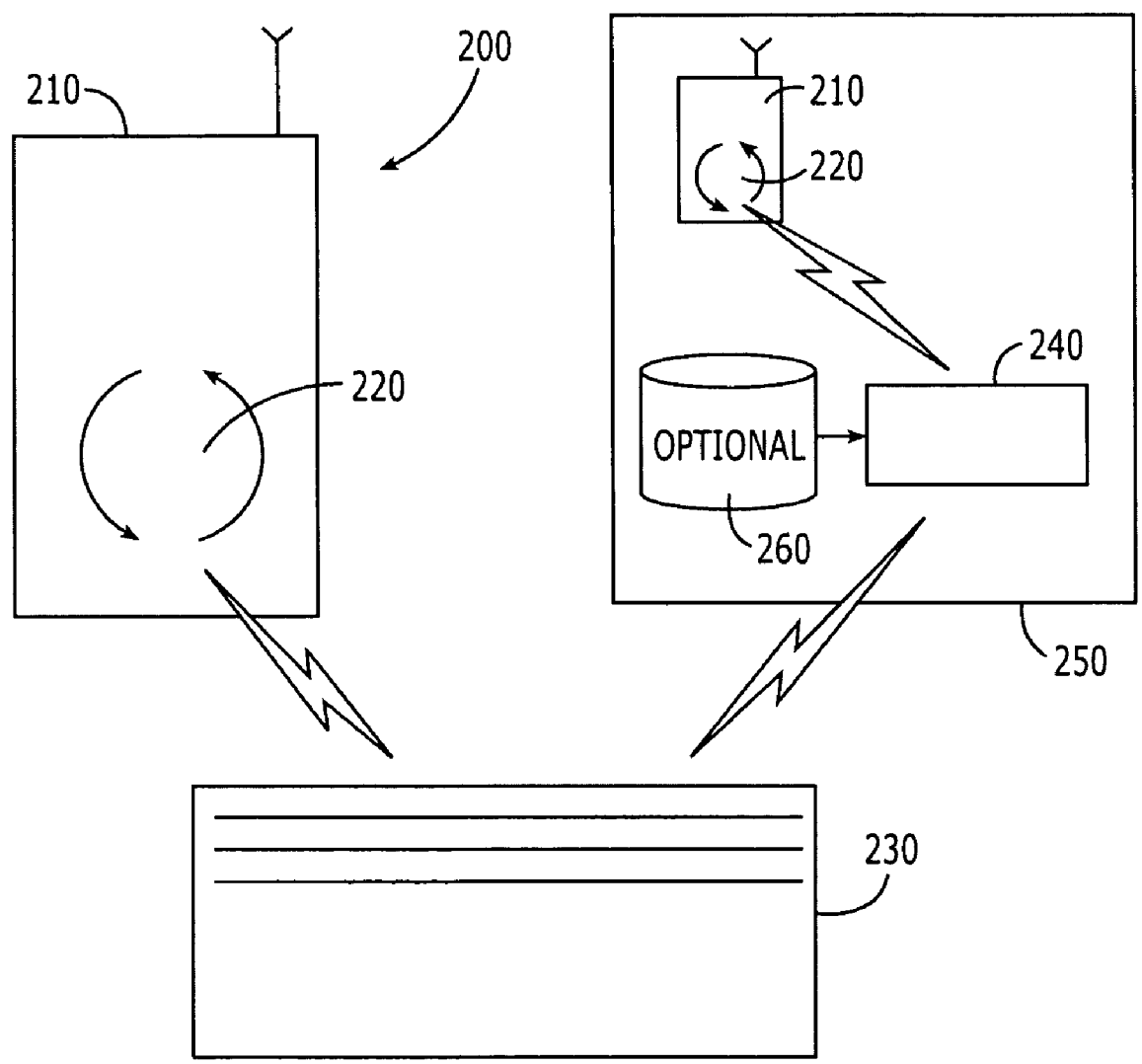

FIG. 2 is a simplified block diagram of a system for downloading content to a mobile terminal in instances in which the terminal is outside of the home network, in accordance with an embodiment of the present invention.

Figure 3:
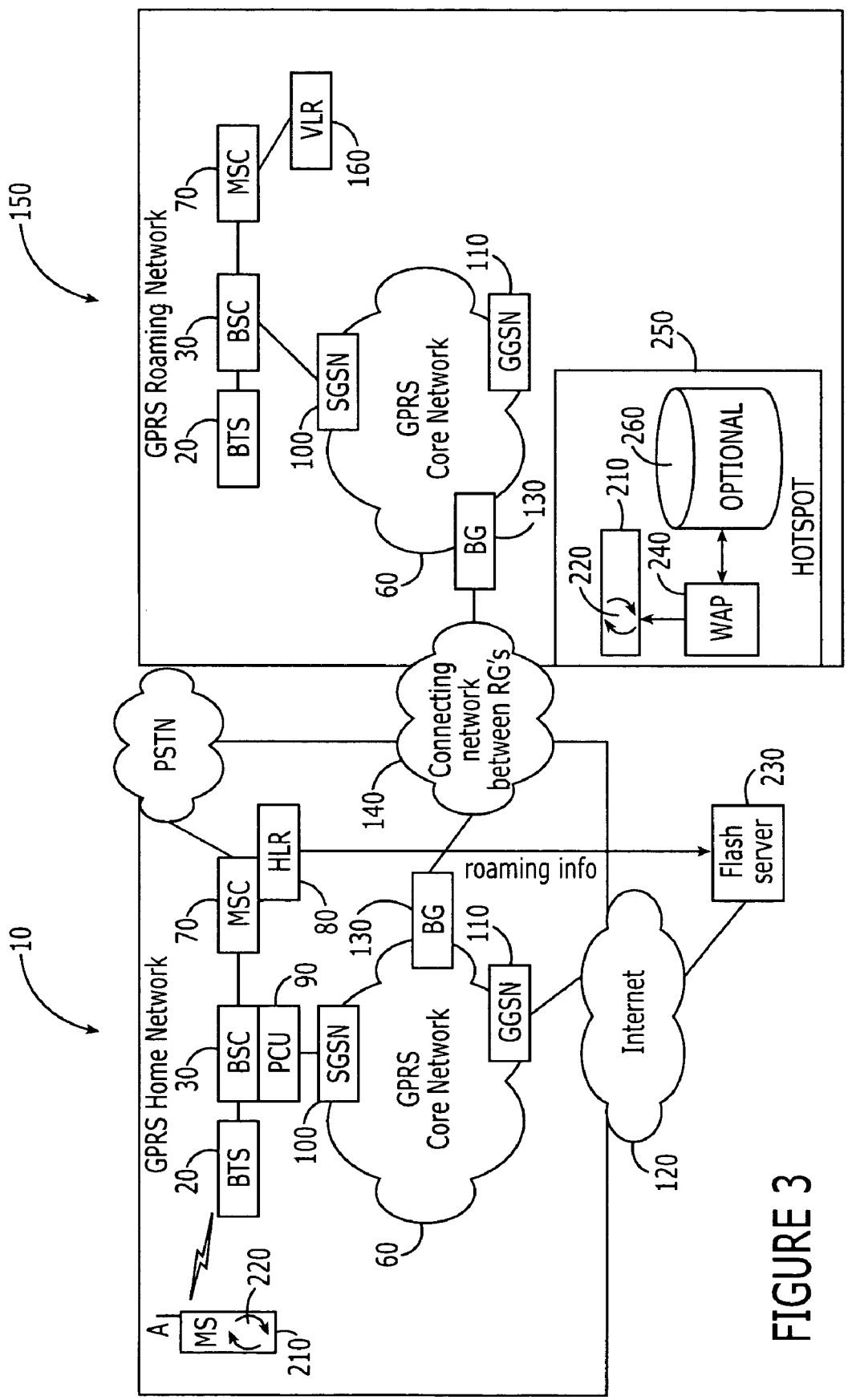

FIG. 3 is a block diagram of a system for downloading content to a mobile terminal in instances in which the terminal is outside of the home network, in accordance with an embodiment of the present invention. The system is depicted amongst the backdrop of the prior art roaming network.

Figure 4:
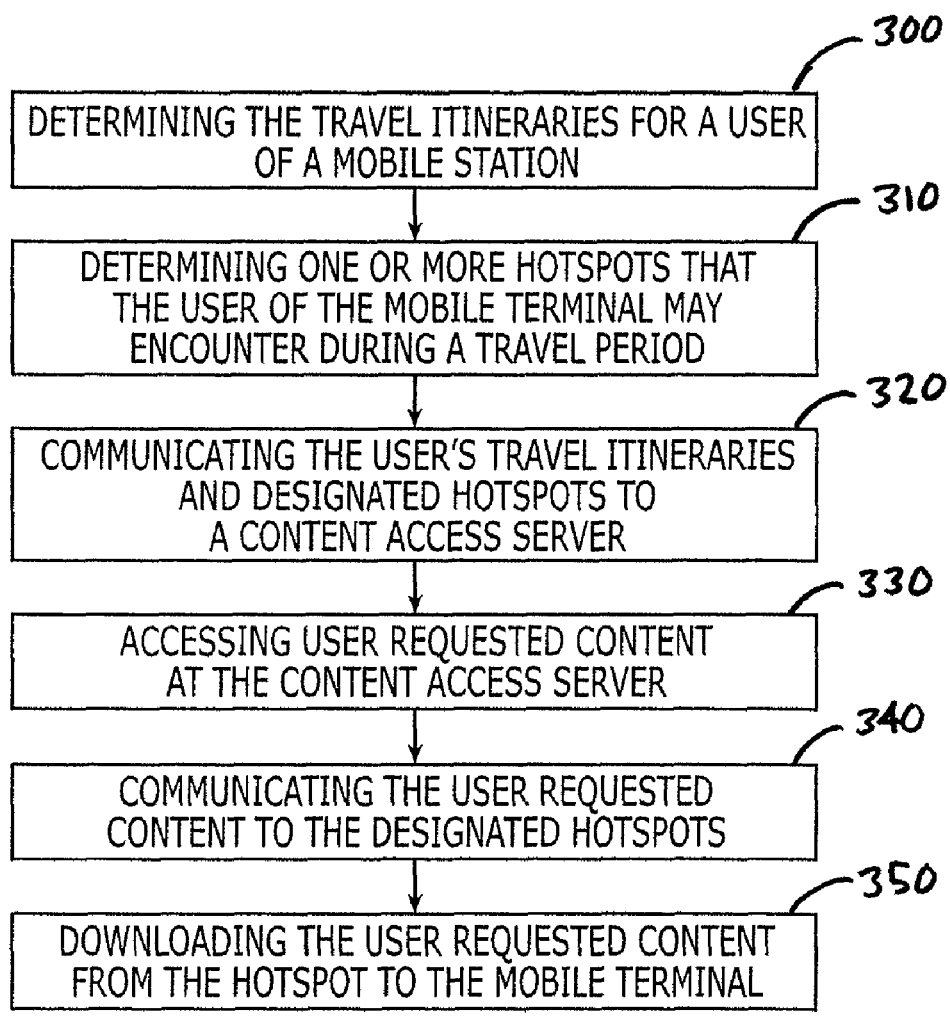

FIG. 4 a flow diagram of a method for providing content downloading to a mobile terminal in which the terminal is outside of the home network, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods, systems, devices and computer program products for providing content downloading to mobile terminals in a roaming environment. The present invention eliminates the need for the content downloading to be performed by a conventional roaming network and, as such, eliminates the costs associated with network communication through roaming networks. In summary, the invention provides for the mobile terminal user to communicate a travel schedule to a special process server, referred to herein as a Flash server. The travel schedule will provide for the periods of time when the mobile terminal user will be outside of the area of the home network. The flash server will subsequently communicate the content to be downloaded to an access point located at a hotspot; i.e., a specific geographic location at which the access point provides public wireless broadband network services to mobile terminal visitors through a Wireless Local Area Network (WLAN), Bluetooth® or the like. For example, the hotspot may be at an airport terminal, a hotel, a convention center or the like. The content is then downloaded to the mobile terminal when the mobile terminal comes in contact with the hotspot.

FIG. 2 provides a block diagram of a system for downloading content to a mobile terminal via a hotspot, in accordance with an embodiment of the present invention. The system 200 will include a mobile terminal 210 that executes a client 220, herein referred to as a flash client. The user of the mobile terminal will input travel information into the client, such as dates and times of travel, travel locations, travel itinerary, etc. This information may be directly entered into the client by the user or the client may be configured to automatically transfer travel information from another application, such as a personal planner application or the like. In addition, the client may be in communication with external databases, such as a user's travel agent database and the relevant travel information may be extracted from the external database as it becomes available.

In addition to inputting travel information into the client 220, the user may choose and input the hotspot(s) at which the content is to be downloaded at during the travel period. The client may present the user with a menu of hotspots based on the inputted travel information or the user may input a hotspot based on their known travel itinerary. In alternate embodiment, the client may be configured to determine, from the inputted travel information, the hotspot(s) at which the content is to be downloaded based on the likelihood of the user coming into contact with the hotspot. Alternatively, the server 230 may determine the hotspot(s) that the content will be downloaded to based on the travel information that is provided to the server.

While in the illustrated embodiment the client 220 is shown as being executed on the mobile terminal 210 that the content will subsequently be downloaded to (i.e., the traveling mobile terminal), in other embodiments the client may be executed by any digital device, such as a personal computer or the like.

The client 230 will be in network communication with a special process server 230, referred to herein as the flash server. As such, the travel information will be communicated from the client to the server and the server will store the travel information in a profile associated with the mobile terminal user. In addition to storing the travel information of the mobile terminal user, the server will either store or have network access to the content that is to be delivered to the mobile terminal. The client may be in wireless or wired network communication with the server. For example, if the client is executed on a mobile terminal, such as a cellular telephone, the client may implement the cellular network to communicate with the server. However, if the client is executed on another digital device, such as a personal computer, the client may access the server over the Internet via a wired network connection.

The server 230 will be in network communication with a plurality of access points 240 located at hotpots 250. Hotspots may be physically located at such places as airport terminals, hotel lobbies or rooms, convention centers, places of business and the like. Typically, the access point will provide for short-range wireless communication in the form of WLAN, Bluetooth®, Infrared (IR) or the like. As such, properly configured mobile terminals will be able to communicate and download content via the access points when the mobile terminal is within the range of the hotspot. The access point may also include a storage unit 260, in which case the access point or the hot spot are referred to as being "intelligent". If the access point is "intelligent" then the server can communicate the content to the access point once the content becomes available and prior to the user coming in contact with the hotspot. Having the content stored at the hotspot will typically provide for faster content transfer between the mobile terminal and the access point when the mobile terminal comes in contact with the hotspot. If the access point lacks intelligence then the content is communicated to the access point when the mobile terminal that requires content downloading comes in contact with the hotspot. The network communication between the server and the access point may be wireless or wired network communication, typically an IP communication is established between the server and the access point.

FIG. 3 provides a block diagram of the system for downloading content to a mobile terminal via hotspot, in accordance with an embodiment of the present invention. In the FIG. 3 embodiment the system of the present invention is depicted in conjunction with a conventional prior art roaming network as a means of distinguishing the architecture and functionality of the roaming network from the system and methods of the present invention. Therefore, it should be obvious to those skilled in the art that the concept and architecture of the roaming network are not required to practice the content downloading function of the present invention.

The system 200 includes a mobile terminal 210 that executes a flash client 220. The client is responsible for assembling mobile terminal travel information and communicating the information to flash server 230. As previously noted, while in the illustrated embodiment the client is executed by a mobile terminal, and typically the mobile terminal that requires content downloading, it is also possible and within the inventive concepts herein disclosed for the flash client to be executed on another digital device, such as a personal computer or the like. The client may obtain travel information from various sources, including but not limited to, user inputted travel information, a calendar or planner application, or an external data base, such as a travel agent database. The client may also provide for the determination of the hotspots at which the content may be downloaded during subsequent travel periods. The client may rely on user inputs to make the determination of the hotspot(s) or the client may provide the user recommendations for hotspots based on the assembled travel information or the client may empirically determine the hotspot(s) based on the assembled travel information.

In the illustrated embodiment of FIG. 3, the mobile terminal 210 relies on the GPRS home cellular network 10 to communicate the travel information and hotspot locations to the flash server 230. As such, travel information is communicated from the mobile terminal to the BTS 20, the BSC 30, and the MSC 70. The HLR 80 at the MSC associates the travel information with a user profile and communicates the travel information and associated data to the flash server.

The flash server will either store or have access, either current access or future access, to the content that requires downloading to the mobile terminal. The server will process the travel information and the hotspot requirements and provide the access point 240 located at the hotspot 250 with the required content. If the hotspot(s) that has been designated as one of the sites for content downloading is an intelligent hotspot, i.e., the access point is associated with local storage capabilities, then the content may be communicated and stored at the hotspot prior to the mobile station coming in contact with the hotspot. As shown in FIG. 3, the flash server 230 will typically communicate the content to the access point via the Internet 120 using conventional IP communication. If the hotspot(s) that has been designated as one of the sites for content downloading is not an intelligent hotspot, then the server will be accessed by the access point when the mobile terminal comes in contact with the hotspot. The access point will typically access the server over conventional IP communication.

Once the mobile terminal 210 roams outside of the GPRS home network 10, the mobile terminal does not have to access the GPRS roaming network 150 in order to download content. Instead, once the mobile terminal comes in contact with the hotspot, a wireless network connection, such as WLAN, IR or Bluetooth® (i.e. communication on the 2.4 GHz frequency band) or the like can be implemented to download the content from the local memory or from the server via the access point.

FIG. 4 provides a flow diagram of a method for downloading content to a mobile station in a roaming environment, in accordance with an embodiment of the present invention. At step 300, a determination is made as to the upcoming travel information for user of a mobile station. In other words, a determination is made as to when the user will be outside of the home network boundaries; conventionally referred to as roaming. Typically, the determination is made by user travel inputs to an appropriate client or by a client interfacing with internal or external databases to determine dates and times of upcoming travel. For example, a client may interface with an internal calendar/planner application to determine a user's upcoming travel itineraries or a client may interface with an external travel agent database to determine the user's travel itinerary.

At step 310, a determination is made as to one or more communication hotspots that the user of the mobile terminal may encounter during a travel period. The determination may be made by user input to a client, including a user choosing from a list of client recommended hotspots that the user may likely encounter during a period of travel. Additionally, the determination may be made by a client based on the travel information determined by the client.

At step 320, the travel information and the designated hotspot information are communicated to a content access server. Communicating the travel information and the designated hotspot information will typically involve conventional network communication. For example, if the client that executes steps 300 and 310 resides on a mobile station then the communication medium will typically be a wireless communication, such as a cellular communication or the like. In another example, if the client that executes steps 300 and 310 resides on another digital device, such as a PC, then the communication medium may be a wired network communication over IP.

At step 330, the content access server accesses and retrieves user requested content. The user requested content may be stored at the server or may be stored remote from the server, such at a content service provider storage location. It is noted that the content may not be immediately available for access upon receipt of the user's travel information. Content may become available on a regular basis, such as daily, weekly or the like, in which case the server will access the data based upon availability. At step 340, the content access server communicates content to the designated hotspot(s). If the hotspot(s) include local storage capacity, communication of the content to the designated hotspot(s) may occur once the service provider has access to the content and prior to the user occupying the hotspot area. If the hotspot(s) do not include storage capacity, communication of the content to the designated hotspot(s) will typically occur once the mobile terminal enters the hotspot area and the hotspot access point accesses the content at the service provider server.

At step 350, the mobile station will download the content when the mobile station occupies the hotspot area. Typically, downloading will occur when the mobile station establishes a network communication with the hotspot access point. The network connection may be a wireless connection, such as WLAN, IR, Bluetooth® or the like, or the connection between the mobile terminal and the access point may be a wired connection. The downloading of the content may be configured by the mobile terminal to occur automatically when the mobile terminal occupies the hotspot area or the downloading may occur at the bequest of the mobile terminal user.

In this regard, FIG. 4 provides for methods and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

In one specific embodiment, the invention may be defined by a computer program product for assessing a mobile terminal user's travel schedule and preparing for content downloading during periods of travel. The computer program will include a computer-readable storage medium having computer-readable program code portions stored therein. The computer-readable program code portions include a first executable portion capable of determining a mobile terminal user's travel schedule and a second executable portion capable of determining one or more hotspots that the user will likely encounter during the user's scheduled travel period.

The first executable portion may determine a mobile terminal user's travel schedule based on user inputs to the computer program, based on accessing one or more user planner/calendar applications, based on accessing one or more external databases or the like.

The executable portions of the computer-readable instructions may also include a third portion capable of activating a short-range communication module when the mobile terminal encounters one of the hotspots during the scheduled travel period. Thereby, allowing for automatic downloading of the content to occur based on the user and mobile terminal occupying the designated hotspot.

Thus, the present invention provides systems, devices and methods for downloading content to a mobile terminal, during periods when the mobile terminal is outside of the home network; i.e. when the terminal is roaming. The invention provides for downloading of the content without utilizing the cellular network, thereby, circumventing the additional surcharges that may be associated with providing for downloading outside of the home network environment. In addition, the invention provides for methods and systems that may be implemented automatically, without the user having to interface with the device or system to implement the change in download techniques. Also, the content can be downloaded during normal download schedules so that the user is not adversely affected by their travel schedule and can be assured scheduled program downloads throughout the travel period. The methods and systems of the present invention are conducive to the users travel schedule and do not require the user to perform additional functions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   determining a travel schedule for a user of a mobile terminal that defines a travel period during which the user will be traveling; and
   determining whether content scheduled to be delivered to the mobile terminal is scheduled to be delivered during the travel period, wherein the content is subscription content that is otherwise delivered to the mobile terminal on a regularly scheduled basis;
   wherein when the content is not scheduled to be delivered during the travel period, scheduling the content to be delivered as the content was previously scheduled to be delivered were the user not traveling; and
   wherein when the content is scheduled to be delivered during the travel period, scheduling the content to be delivered in a manner different than previously scheduled were the user not traveling by:
   determining one or more network access points associated with the travel period, each network access point comprising a short range wireless communication network; and
   directing communication of the content to at least one of the one or more network access points prior to the mobile terminal coming into contact with the at least one network access point, wherein directing communication of the content to at least one or more network access points comprises directing communication of the content to the at least one network access point with instructions to download the content to the mobile terminal when the mobile terminal comes in contact with the at least one network access point.

2. The method of claim 1, wherein determining a travel schedule for a user of a mobile terminal that defines a travel period further comprises receiving a travel schedule for the user of the mobile terminal.

3. The method of claim 1, wherein determining one or more network access points associated with the travel period further comprises determining one or more roaming network access points that the user will likely encounter during the scheduled travel period.

4. The method of claim 3, wherein determining one or more roaming network access points that the user will likely encounter during the scheduled travel period further comprises executing a client application to determine the one or more roaming network access points that the user will likely encounter during the travel period.

5. The method of claim 3, wherein determining one or more roaming network access points that the user will likely encounter during the scheduled travel further comprises comparing the travel schedule to a database of roaming network access points to determine the network access points that the user will likely encounter during the travel period.

6. The method of claim 3, wherein determining one or more roaming network access points that the user will likely encounter during the travel period further comprises providing the user with a selection of recommended roaming network access points based upon determining the one or more roaming network access points that the user will likely encounter during the travel period.

7. The method of claim 3, wherein determining one or more roaming network access points that the user will likely encounter during the travel period further comprises executing a server application to determine the one or more roaming network access points that the user will likely encounter during the travel period.

8. The method of claim 1, wherein directing communication of content to at least one of the one or more network access points further comprises directing communication, during the travel period, of content to at least one or more roaming network access points that the user will likely encounter during the travel period.

9. The method of claim 1, wherein directing communication of content to at least one of the one or more network access points further comprises directing communication, prior to the travel period, of content to at least one or more roaming network access points that the user will likely encounter during the travel period.

10. The method of claim 9, wherein directing communication of content to at least one of the one or more network access points further comprises directing communication, prior to the travel period, of content to at least one or more home network access points that the user will likely encounter prior to the travel period.

11. A method comprising:
    Determining, by a processor, a travel schedule for a user of a mobile terminal that defines a travel period during which the user will be traveling, such that it is determinable whether content scheduled to be delivered to the mobile terminal is scheduled to be delivered to the mobile terminal during the travel period, wherein the content is subscription content that is otherwise delivered to the mobile terminal on a regularly scheduled basis;
    receiving at the mobile terminal, prior to the travel period, the content scheduled to be delivered to the mobile terminal during the travel period;
    causing storage of the content in mobile terminal memory such that the stored content is not accessible to the user until a regularly scheduled delivery time; and
    providing the user access to the stored content at the regularly scheduled delivery time, which occurs during the travel period.

12. The method of claim 11, wherein determining a travel schedule for a user of a mobile terminal that defines a travel period further comprises executing a client application on the mobile terminal to determine a travel schedule for the user of the mobile terminal.

13. The method of claim 11, further comprising causing the travel schedule to be sent to a content server, wherein receiving, prior to the travel period, content scheduled to be delivered to the mobile terminal during the travel period comprises receiving the content from the content server based at least in part on the travel schedule sent to the content server.

14. The method of claim 11, wherein determining the travel schedule comprises determining the travel schedule based at least in part on one or more of a planner application, calendar application, an external database, or a travel agent database.

15. An apparatus comprising at least one processor and at least one memory storing computer program code, wherein the at least one memory and stored computer program code are configured to, with the at least one processor, cause the apparatus to at least:
    receive a user travel schedule sent by a mobile terminal, the travel schedule defining a travel period during which the user will be traveling;
    respond to receipt of the user travel schedule by determining whether content scheduled to be delivered to the mobile terminal is scheduled to be delivered to the mobile terminal during the travel period, wherein the content is subscription content that is otherwise delivered to the mobile terminal on a regularly scheduled basis; and cause communication of the content, which is scheduled for delivery during the travel period, to the mobile terminal prior to the travel period, such that the content scheduled for delivery during the travel period is stored on a memory of the mobile terminal and is not accessible to a user of the mobile terminal until a regularly scheduled delivery time, upon occurrence of which during the travel period, the user of the mobile terminal is provided access to the stored content.

16. The apparatus of claim 15, wherein the apparatus comprises or is embodied on a content server.

17. The apparatus of claim 15, wherein the at least one memory and stored computer program code are configured to, with the at least one processor, further cause the apparatus to cause communication with a client application executed by the mobile terminal, wherein the received user travel schedule is sent by the client application.

18. An apparatus comprising at least one processor and at least one memory storing computer program code, wherein the at least one memory and stored computer program code are configured to, with the at least one processor, cause the apparatus to at least:
execute a client application configured to determine a user's travel schedule during which the user will be traveling, which defines a travel period and to determine one or more network access points associated with the travel schedule, each network access point comprising a short range wireless communication network;
direct communication of the user's travel schedule and the one or more determined network access points to a content server, the content server configured to determine whether content scheduled to be delivered to the device is scheduled to be delivered during the travel period, wherein the content is subscription content that is otherwise delivered to the apparatus on a regularly scheduled basis, and wherein the content server is configured to access content that is scheduled to be delivered to the apparatus during the travel period; and
provide for downloading of the content scheduled to be delivered to the apparatus during the travel period when the apparatus encounters one of the determined network access points, such that the content scheduled to be delivered during the travel period is delivered to the apparatus in a manner different than previously scheduled were the user not traveling.

19. The apparatus of claim 18, wherein the client application is further configured to define the one or more network access points as roaming network access points that the user will likely encounter during the travel period.

20. The apparatus of claim 18, wherein the client application is further configured to define the one or more network access points as home network access points that the user will likely encounter prior to the travel period.

21. The apparatus of claim 18, wherein the at least one memory and stored computer program code are configured to, with the at least one processor, further cause the apparatus to provide for cellular communication of the user's travel schedule and one or more network access points to a network server configured to provide content access.

22. A computer program product comprising a non-transitory computer-readable storage medium having computer-readable program code portions stored therein, the computer-readable program code portions comprising:
a program code portion configured to determine a mobile terminal user's travel schedule, which defines a travel period during which the user will be traveling;
a program code portion configured to determine one or more network access points associated with the travel period, each network access point comprising a short range wireless communication network;
a program code portion configured to determine whether content scheduled to be delivered to the mobile terminal is scheduled to be delivered to the mobile terminal during the travel period, wherein the content is subscription content that is otherwise delivered to the mobile terminal on a regularly scheduled basis; and
a program code portion configured to cause the content scheduled to be delivered to the mobile terminal during the travel period to be communicated to at least one of the one or more network access points prior to the mobile terminal coming into contact with the at least one network access point, wherein the program code portion is configured to cause the content to be communicated to at least one or more network access points at least in part by causing the content to be communicated to the at least one network access point with instructions to download the content to the mobile terminal when the mobile terminal comes in contact with the at least one network access point, such that the content scheduled to be delivered during the travel period is delivered to the mobile terminal in a manner different than previously scheduled were the user not traveling.

23. The computer program product of claim 22, wherein the program code portion configured to determine a mobile terminal user's travel schedule further includes a portion configured to determine a mobile terminal user's travel schedule based at least in part on user inputs to the computer program.

24. The computer program product of claim 22, wherein the program code portion configured to determine a mobile terminal user's travel schedule further includes a portion configured to determine a mobile terminal user's travel schedule based at least in part on accessing one or more user planner applications.

25. The computer program product of claim 22, wherein the program code portion configured to determine a mobile terminal user's travel schedule further includes a portion configured to determine a mobile terminal user's travel schedule based at least in part on accessing one or more external databases.

26. The computer program product of claim 22, wherein the program code portion configured to determine one or more network access points associated with the travel period is further configured to define the one or more network access points as roaming network access points that user will likely encounter during the travel period.

27. The computer program product of claim 22, wherein the program code portion configured to determine one or more network access points associated with the travel period is further configured to define the one or more network access points as home network access points that user will likely encounter prior to the travel period.

28. The computer program product of claim 22, wherein the program code portion configured to determine a mobile terminal user's travel schedule further includes a portion configured to cause a mobile terminal user's travel schedule to be received from the mobile terminal.

29. A system comprising:
a travel schedule determining system configured to determine a travel schedule for a user of a mobile terminal that defines a travel period during which the user will be traveling;
a network access point determining system configured to determine one or more network access points associated with the travel period, each network access point comprising a short range wireless communication network; and a communication system configured to determine whether content scheduled to be delivered to the mobile terminal is scheduled to be delivered to the mobile terminal during the travel period, wherein the content is subscription content that is otherwise delivered to the mobile terminal on a regularly scheduled basis, and to communicate the content scheduled to be delivered to the mobile terminal during the travel period to at least one of the one or more network access points prior to the mobile terminal coming into contact with the at least one of the one or more network access points, wherein the communication system is further configured to communicate the content to the at least one network access point with instructions to download the content to the mobile terminal when the mobile terminal comes in contact with the at least one of the network access points, such that the content scheduled to be delivered during the travel period is delivered to the mobile terminal in a manner different than previously scheduled were the user not traveling.

30. A method comprising:

determining a travel schedule for a user of a mobile terminal, wherein the travel schedule comprises a travel period during which the user will be traveling, the travel schedule defining a travel route;

determining one or more network access points associated with the travel route of the determined travel schedule, each network access point comprising a short range wireless communication network;

directing communication of information to a server, the communicated information being about the travel schedule and the one or more network access points;

determining from the travel schedule whether content scheduled to be delivered to the mobile terminal is scheduled to be delivered to the mobile terminal during the travel period, wherein the content is subscription content that is otherwise delivered to the mobile terminal on a regularly scheduled basis; and directing download of content comprising content scheduled to be delivered to the mobile terminal during the travel period from the one or more network access points when the mobile terminal comes in contact with at least one of the one or more network access points, such that the content scheduled to be delivered to the mobile terminal during the travel period is delivered to the mobile terminal in a manner different than previously scheduled were the user not traveling.

31. The method of claim 30, wherein determining a travel schedule for a user of a mobile terminal further comprises executing a client application on the mobile terminal to determine the travel schedule for the user of the mobile terminal.

32. The method of claim 31, wherein executing a client application on the mobile terminal to determine the travel schedule further comprises inputting the travel schedule into the client application.

33. The method of claim 31, wherein executing a client application on the mobile terminal to determine the travel schedule further comprises accessing a user travel schedule application to determine a travel schedule for the user of the mobile terminal.

34. The method of claim 31, wherein executing a client application on the mobile terminal to determine the travel schedule further comprises accessing an external database to determine the travel schedule for the user of the mobile terminal.

35. The method of claim 30, wherein determining one or more network access points associated with the travel route further comprises determining one or more roaming network access points that the user will likely encounter along the scheduled travel route.

36. The method of claim 35, wherein determining one or more roaming network access points that the user will likely encounter along the scheduled travel route further comprises comparing the travel route to a database of roaming network access points to determine the network access points that the user will likely encounter along the scheduled travel route.

37. The method of claim 35, wherein determining one or more roaming network access points that the user will likely encounter along the scheduled travel route further comprises providing the user with a selection of recommended roaming network access points based upon determining the one or more roaming network access points that the user will likely encounter along the scheduled travel route.

38. The method of claim 30, wherein directing communication to a server comprises directing communication to a server configured to access the content to be downloaded.

39. A mobile terminal comprising:

a travel schedule determining system configured to determine a travel schedule for a user of the mobile terminal, the travel schedule defining a travel route and a travel period during which the user will be traveling;

a network access point determining system configured to determine one or more network access points associated with the travel route of the determined travel schedule, each network access point comprising a short range wireless communication network; and a communication system configured to communicate to a server information about the travel schedule and the one or more network access points, wherein the server is configured to determine whether content scheduled to be delivered to the mobile terminal is scheduled to be delivered during the travel period, wherein the content is subscription content that is otherwise delivered to the mobile terminal on a regularly scheduled basis, and wherein the communication system is further configured to download content scheduled to be delivered during the travel period from the one or more network access points when the mobile terminal comes in contact with at least one of the one or more network access points, such that the content scheduled to be delivered during the travel period is delivered to the mobile terminal in a manner different than previously scheduled were the user not traveling.

40. A method comprising:

determining a mobile terminal user's travel schedule, which defines a travel period during which the user will be traveling;

determining whether content scheduled to be delivered to the mobile terminal is scheduled to be delivered during the travel period, wherein the content is subscription content that is otherwise delivered to the mobile terminal on a regularly scheduled basis;

determining one or more network access points associated with the travel schedule using the mobile terminal, each network access point comprising a short range wireless communication network;

directing communication of the user's travel schedule and the one or more determined network access points from the mobile terminal to a content server, the content server configured to access content that is scheduled to be delivered to the mobile terminal during the travel period; and directing download of content scheduled to be delivered during the travel period when the mobile terminal encounters one of the determined network access points, such that the content scheduled to be delivered during the travel period is delivered to the mobile terminal in a manner different than previously scheduled were the user not traveling.

41. The method of claim 40, wherein determining one or more network access points associated with the travel period comprises determining one or more roaming network access points that the user will likely encounter during the scheduled travel period.

42. The method of claim 41, wherein determining one or more roaming network access points that the user will likely encounter during the scheduled travel further comprises comparing the travel schedule to a database of roaming network access points to determine the network access points that the user will likely encounter during the travel period.

43. The method of claim 41, wherein determining one or more roaming network access points that the user will likely encounter during the travel period further comprises causing the user to be provided with a selection of recommended roaming network access points selected based at least in part upon the determined one or more roaming network access points that the user will likely encounter during the travel period.

44. An apparatus comprising at least one processor and at least one memory storing computer program code, wherein the at least one memory and stored computer program code are configured to, with the at least one processor, cause the apparatus to at least:
determine a travel schedule of a user of the apparatus, the travel schedule defining a travel period during which the user will be traveling;
determine whether content scheduled to be delivered to the apparatus is scheduled to be delivered during the travel period, wherein the content is subscription content that is otherwise delivered to the mobile terminal on a regularly scheduled basis;
determine one or more network access points associated with the travel schedule, each network access point comprising a short range wireless communication network;
cause communication of the travel schedule and the one or more determined network access points to a content server, the content server configured to access content that is scheduled to be delivered to the apparatus during the travel period; and
cause download of content scheduled to be delivered during the travel period in response to the apparatus encountering one of the determined network access points, such that the content scheduled to be delivered during the travel period is delivered to the apparatus in a manner different than previously scheduled were the user not traveling.

45. The apparatus of claim 44, wherein the at least one memory and stored computer program code are configured to, with the at least one processor, cause the apparatus to determine one or more network access points associated with the travel period at least in part by determining one or more roaming network access points that the user will likely encounter during the scheduled travel period.

46. The apparatus of claim 45, wherein the at least one memory and stored computer program code are configured to, with the at least one processor, cause the apparatus to determine one or more roaming network access points that the user will likely encounter during the scheduled travel at least in part by comparing the travel schedule to a database of roaming network access points to determine the network access points that the user will likely encounter during the travel period.

47. The apparatus of claim 45, wherein the at least one memory and stored computer program code are configured to, with the at least one processor, to further cause the apparatus to cause the user to be provided with a selection of recommended roaming network access points selected based at least in part upon the determined one or more roaming network access points that the user will likely encounter during the travel period.

48. The apparatus of claim 44, wherein the apparatus comprises or is embodied on a mobile phone.

49. An apparatus comprising at least one processor and at least one memory storing computer program code, wherein the at least one memory and stored computer program code are configured to, with the at least one processor, cause the apparatus to at least:
determine a travel schedule for a user of a mobile terminal that defines a travel period during which the user will be traveling; and
determine whether content scheduled to be delivered to the mobile terminal is scheduled to be delivered during the travel period, wherein the content is subscription content that is otherwise delivered to the apparatus on a regularly scheduled basis;
wherein when the content is not scheduled to be delivered during the travel period, scheduling the content to be delivered as the content was previously scheduled to be delivered were the user not traveling; and
wherein when the content is scheduled to be delivered during the travel period, scheduling the content to be delivered in a manner different than previously scheduled were the user not traveling by:
determining one or more network access points associated with the travel period, each network access point comprising a short range wireless communication network; and
causing communication of the content to at least one of the one or more network access points prior to the mobile terminal coming into contact with the at least one network access point, wherein causing communication of the content to at least one or more network access points comprises causing communication of the content to the at least one network access point with instructions to download the content to the mobile terminal in response to the mobile terminal coming in contact with the at least one network access point.

50. The apparatus of claim 49, wherein determining one or more network access points associated with the travel period further comprises determining one or more roaming network access points that the user will likely encounter during the scheduled travel period.

51. The apparatus of claim 50, wherein determining one or more roaming network access points that the user will likely encounter during the scheduled travel further comprises comparing the travel schedule to a database of roaming network access points to determine the network access points that the user will likely encounter during the travel period.

52. The apparatus of claim 50, wherein determining one or more roaming network access points that the user will likely encounter during the travel period further comprises providing the user with a selection of recommended roaming network access points based upon determining the one or more roaming network access points that the user will likely encounter during the travel period.

* * * * *